United States Patent [19]
Kauranen

[11] 3,751,632
[45] Aug. 7, 1973

[54] OVEN AND CONTROL CIRCUIT THEREFOR
[75] Inventor: Herbert A. Kauranen, Grandville, Mich.
[73] Assignee: Kelvinator, Inc., Grand Rapids, Mich.
[22] Filed: Oct. 18, 1971
[21] Appl. No.: 189,903

[52] U.S. Cl. .................................. 219/492, 219/413
[51] Int. Cl. .............................................. H05b 1/02
[58] Field of Search.................... 219/398, 412, 413, 219/492

[56] References Cited
UNITED STATES PATENTS
| | | | |
|---|---|---|---|
| 3,364,338 | 1/1968 | Holtkamp | 219/398 |
| 3,575,584 | 4/1971 | Goodhouse | 219/492 |
| 3,358,121 | 12/1967 | Bowling | 219/413 X |
| 2,935,591 | 5/1960 | Lee | 219/413 X |
| 2,422,526 | 6/1947 | Burch | 219/413 |

Primary Examiner—Bernard A. Gilheany
Assistant Examiner—F. E. Bell
Attorney—Harold F. McNenny et al.

[57] ABSTRACT

An oven and control circuit is disclosed in which four different modes of operation are provided. In one mode of baking, both the broil heating element and the bake heating element are operated on demand of the oven thermostat. The broil heating element is operated on a timed on-off cycle to provide top heat for browning or the like. In a second bake mode of operation, top heat is not provided but the control circuit is operated automatically to change to a keep-warm mode of operation at the end of the baking time. In the keep-warm mode, the broil heating element is provided with full voltage but is operated with a timed on-off cycle of relatively short duration with the cycle time arranged to establish a heat balanced condition when the desired keep-warm temperature is reached so that low temperature thermostat means are not required. In the broil mode of operation, the broil heating element can be operated with a timed on-off cycle which can be adjusted to regulate broiling heat.

13 Claims, 4 Drawing Figures

Patented Aug. 7, 1973 3,751,632

OVEN AND CONTROL CIRCUIT THEREFOR

BACKGROUND OF THE INVENTION

This invention relates generally to domestic oven appliances and more particularly to a novel and improved bake-broil oven providing a keep-warm mode of operation.

PRIOR ART

Domestic ovens arranged for both baking and broiling operations are well known and in many instances, such ovens are provided with a keep-warm mode of operation in which the oven is maintained at a relatively low temperature to keep the contents warm for an extended period of time. In some instances, the prior art suggests that food such as roasts be cooked under normal baking or roasting temperatures and thereafter maintained at a warm serving temperature at which substantially no further cooking occurs until the food is required. In other instances, the prior art suggests the keep-warm temperature be utilized for extremely slow cooking of certain types of foods. Examples of such prior art patents are U.S. Letters Pat. Nos. 3,093,722; 3,358,122; 3,364,338; 3,560,711; and 3,575,584.

In most domestic electric ovens, a bake heating element is located in the lower portion of the oven enclosure and a broil heating element is located in the upper portion of the oven enclosure. In some such ovens, a mode of operation is provided for normal baking operations in which top heat is supplied by the broil heating element. In such ovens, both heaters are usually controlled by the oven thermostat and supply heat on thermostat demand to maintain a predetermined temperature set on the thermostat. In some such top heat ovens, the bake heating element operates continuously when heat is demanded by the thermostat but the broil or upper heating element is operated in a cyclic manner with a predetermined timed cycle when the oven thermostat is demanding heat.

Such top heat is particularly advantageous when baking bread, cookies and the like since a browning of the top of such bakery is usually desired. The U.S. Letters Pat. Nos. 2,845,517; 2,863,976; and 2,883,508 illustrate ovens providing top heat in this general manner. In some ovens which utilize the broil heating element in this manner to provide top heat, means are provided to adjust the on-off cycle time of the broil heating element during broiling operations to permit adjustment of the rate of broiling. Usually, such adjustment permits the cycle mechanism to be blocked so that the broiler may be operated continuously during the broiling operation or adjusted to provide on-off cycle time in which the on period is less than 100 percent by some desired adjusted amount.

SUMMARY OF THE INVENTION

In accordance with one important aspect of this invention, a novel and improved bake-broil oven is provided in which a low temperature keep-warm mode of operation is provided by operating the broil heating element in a cyclic manner with a predetermined timed on-off cycle to maintain a keep-warm temperature in the order of 170°F.

In the illustrated embodiment, the oven can be supplied with top heat during baking by cycling the broil heating element. Further, the same cyclic operation of the broil heating element is used to provide keep-warm operation. The control circuit functions to automatically shut-off the bake heating element at the completion of the set time for baking or roasting and automatically institutes a keep-warm mode of operation thereafter. In this embodiment, it is not necessary to provide a separate thermostat to control the keep-warm temperature since the cycle time of the broil heating element is selected to supply heat to the oven at a rate which produces a balanced condition in which the rate of heat supplied to the oven equals the rate of heat dissipated therefrom when the desired keep-warm temperature is reached. In such embodiment, full voltage is applied to the broil heating element during all of its operating conditions, and it is not necessary to reduce its voltage for keep-warm operation.

An even heat condition is established for the keep-warm mode of operation even though a relatively high power broil heater is employed due to the fact that broil heater is cycled on for periods of relatively short duration in the order of 5 to 7 seconds during each cycle and is on about 8 percent of the total cycle time. Because the cycles of on time are of relatively short duration, the tendency to overshoot or override is minimized, and a relatively constant keep-warm temperature is obtained.

These and other aspects of this invention will become apparent from the following detailed description.

DETAILED DESCRIPTION OF THE DRAWINGS

Figure 1:
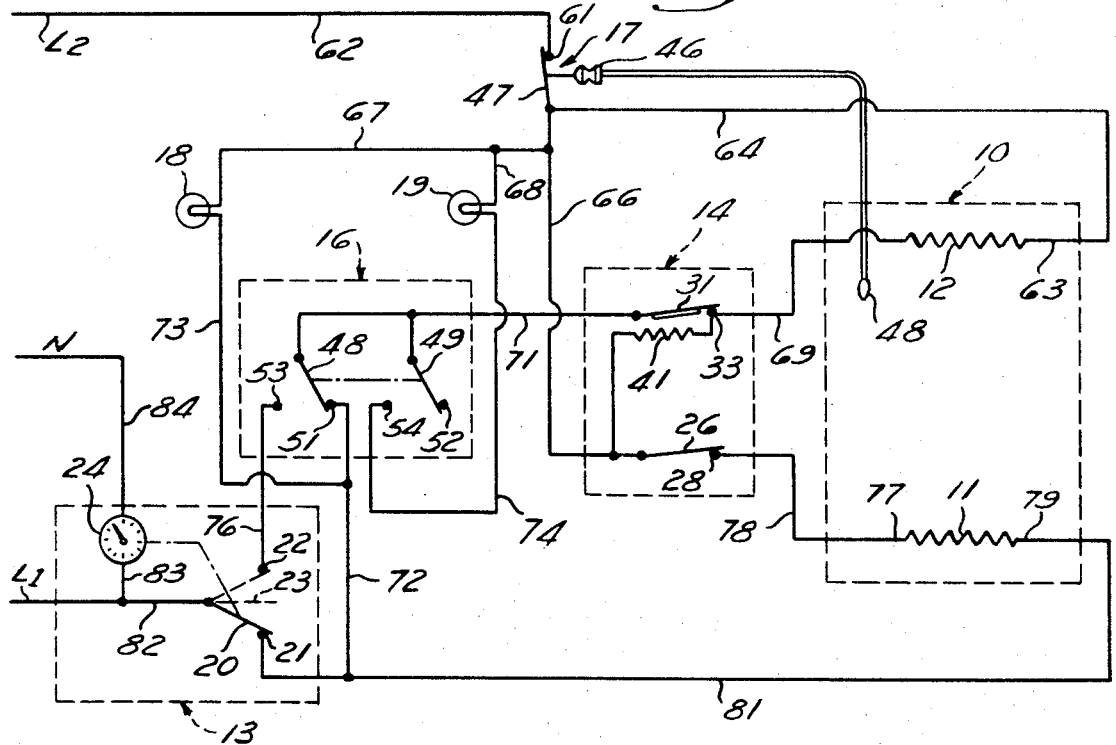
FIG. 1 is a circuit diagram illustrating a preferred oven control circuit incorporating this invention illustrating the circuit in a first bake mode of operation in which top heat is supplied.
Figure 2:
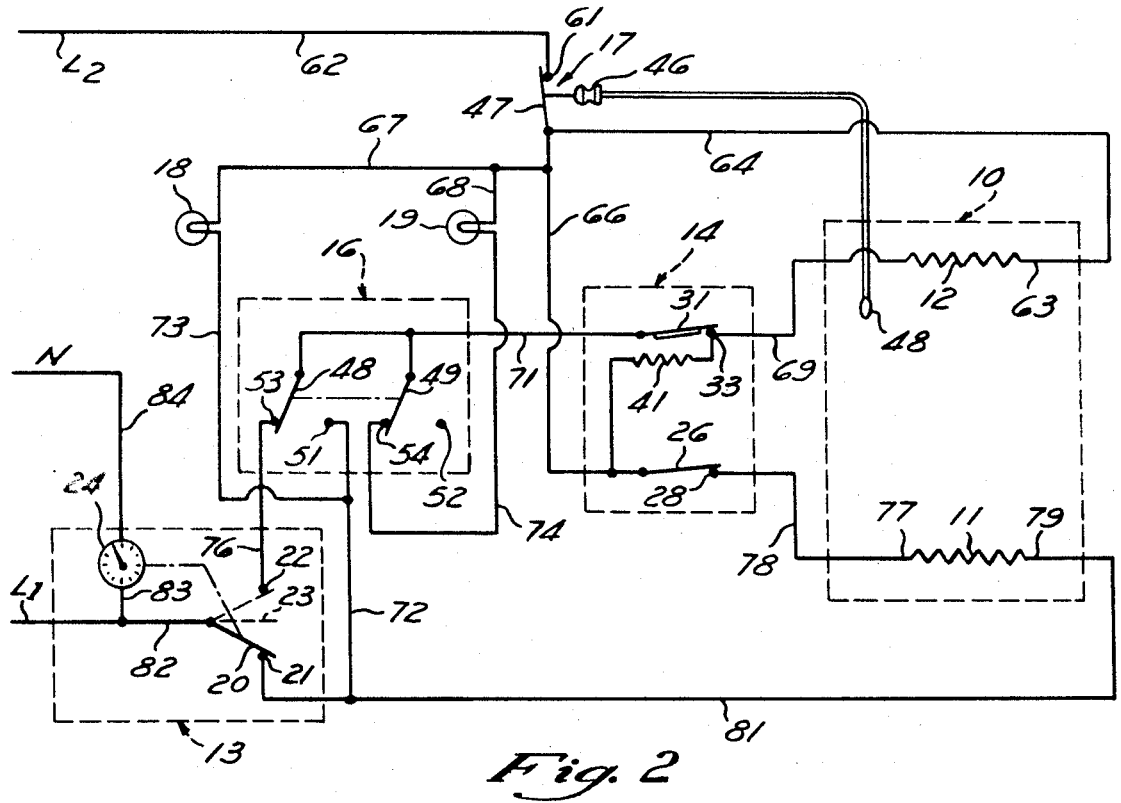
FIG. 2 is a diagram similar to FIG. 1 illustrating the circuit in the timed bake mode of operation with no top heat which is used prior to the keep-warm mode of operation.
Figures 3, 4:
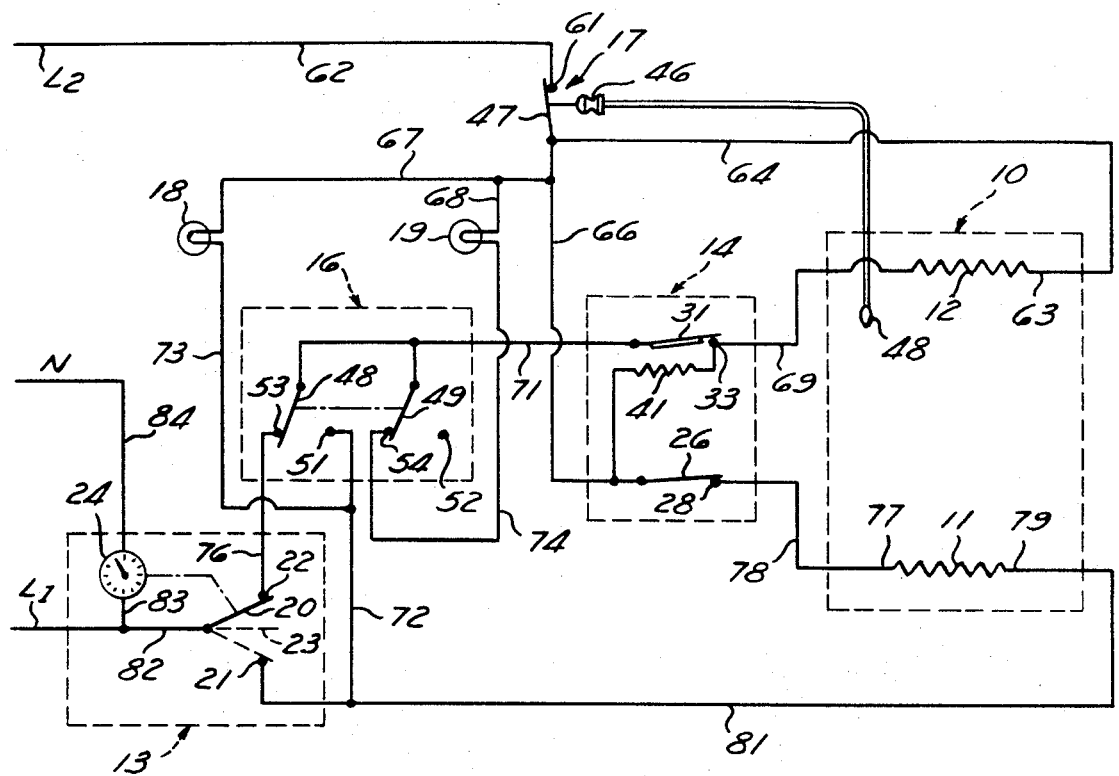
FIG. 3 is a diagram similar to FIGS. 1 and 2 illustrating the circuit in a keep-warm mode of operation.
FIG. 4 is a schematic illustration of the oven selector switch which includes means for producing the on-off timed cycle of the broil heating element.

FIGS. 1 through 3 illustrate a control circuit in accordance with one embodiment of this invention and illustrate such control circuit in various modes of operation. In such drawings, the oven enclosure is schematically illustrated by the dotted rectangle 10. Mounted near the lower surface of the oven enclosure 10 is a bake heating element 11 which is the principal heating element utilized for baking and roasting. A second or broil heating element 12 is mounted at the upper portion of the oven enclosure 10, and it is this element which is utilized for broiling. As discussed in detail below, the broil heating element is also utilized for supplying top heat in one mode of baking operation.

The control circuit for the two heating elements 11 includes a timer switch control 13, a selector switch control 14, a keep-warm switch control 16, and an adjustable oven thermostat switch control 17. The circuit also includes an oven signal light 18 and a keep-warm signal light 19.

The timer switch control 13 provides a three position single pole switch arm 20 which is movable from a first position illustrated in FIG. 1 in which it engages a contact 21, a second position in which it engages a contact 22, and a third or center off position illustrated by the dotted position 23. A clock-type timer 24 is connected to operate the switch arm 20 from the position in which it engages the contact 21 to a position in which it engages the contact 22 after a time period which is set on the timer. The switch arm 20 can also be manually operated for non-timed operation or for shuting the system off. Timer switches of this type are well known in the oven art and, therefore, need not be described in structural detail.

A selector switch 14 is a double pole, single throw switch as best illustrated by the schematic drawings of FIG. 4. The switch includes a first switch arm 26 formed of spring material and having a contact 27 at its free end which is movable into and out of engagement with a fixed contact 28. The switch arm 26 is biased against a manually operated cam 29 and is open in its normal condition illustrated in FIG. 4. A projection 30 formed on the cam 29 is moved down into engagement with the switch arm 26 to close the contacts 27 and 28 when the cam is rotated in a clockwise direction from the position illustrated in FIG. 4. Therefore, the switch arm 26 provides a simple on-off switch, the operation of which is controlled by the cam 29.

The selector switch 14 also includes a second switch arm 31 which is also formed of spring metal and is provided with a movable contact 32 adjacent to its free end. The contact 32 is movable into and out of engagement with a fixed contact 33. A control lever 34 is pivoted at 36 and is provided with two legs 37 and 38, at least one leg 37 of which is formed of bimetal. The outer end of the bimetal leg 37 is connected to an upstanding projection 39 on the spring arm 31 and the outer end of the leg 38 engages the cam 29. A resistance heater 41 is positioned adjacent to the leg 37 and is operable when energized to heat the leg 37 causing a thermally induced force which overcomes the bias of the spring of the arm 31 and causes separation of the two contacts 32 and 33. In the circuit the resistance heater 41 is connected so that it is energized only when the contacts 32 and 33 are closed. Consequently, it functions to heat the bimetal leg 37 when the contacts are closed causing opening of the contacts. Thereafter because the heater is not energized, the leg 37 cools allowing reclosure of the contacts 32 and 33. This structure provides an automatic on-off timed cycling of the arm 31.

Adjustment of the on-off timed cycle is accomplished by rotating the cam 29 until a ramp 42 moves under the arm 38 to produce clockwise rotation of the leg 38. This increases the bias of the leg 37 toward a contact closed position which progressively increases on time periods. Consequently, rotation of the cam 29 manually varies the on-off cycle produced. In the illustrated embodiment, the various elements are proportioned so that the on period of the cycle can be adjusted from about 8 percent of the total cycle when the cam 29 is in the illustrated position to a condition in which the contacts do not cycle and remain closed 100 percent of the time in the other extreme position. In intermediate positions, the ratio of on-off time is varied between 100 percent on and 8 percent on.

The oven thermostat 17 can be of any suitable type. The illustrated thermostat includes a bellows 46 connected to operate a switch arm 47 in response to changes in temperature of a bulb 48 located within the oven enclosure 10. Such thermostats are well known and are adjustable through the normal operating range of the oven. They function to cause the oven heating elements to cycle on and off on demand to maintain a predetermined temperature set by the user.

The keep-warm switch 16 is a double pole, double throw switch having two contact arms 48 and 49 which are connected together for simultaneous operation. In one position, the arm 48 engages a contact 51 and the arm 49 engages the contact 52. In the illustrated circuit, the contact 52 is not connected to the remaining portion of the circuit. Operation of the keep-warm switch from the off position illustrated in FIG. 1 causes the arm 48 to close with the contact 53 and the arm 49 to close with the contact 54. The two signal lights 18 and 19 are conventional 230 volt lights which operate to indicate to the user the operating mode or condition existing at a particular time.

The various control elements of the circuit are connected together and to a typical 115°–230° 60 cycle power supply in which 230 volts is supplied between $L_1$ and $L_2$ and 115 volts is supplied between the neutral N and either $L_1$ and $L_2$. The line $L_2$ is connected to the contact 61 of the oven thermostat switch 17 by a line 62. The switch arm 47 of the oven thermostat switch 17 is connected to one end 63 of the broiler heating element 12 by a line 64, the switch arm 26 of the selector switch 14 by a line 66, and one side of each of the signal lights 18 and 19 by lines 67 and 68, respectively. The other end of the broil heating element 12 is connected to the stationary contact 33 of the selector switch 14 by a line 69. The contact arm 31 of the selector switch is connected to both of the switch arms 48 and 49 of the keep-warm switch 16 by a line 71. The contact 51 of the keep-warm switch 16 is connected to both the contact 21 of the timer 13 and the other side of the indicator light 18 by lines 72 and 73, respectively, while the contact 54 of the keep-warm switch is connected to the other side of the indicator light 19 by a line 74. The contact 53 of the keep-warm switch 16 is connected to the other contact 22 of the timer switch 13 by a line 76.

One end 77 of the bake heating unit is connected to the terminal 28 of the selector switch 14 by a line 78 and the other end 79 is connected to the contact 21 of the timer 13 by a line 81. The other power supply line $L_1$ is connected to the switch arm 20 by a line 82 and to one side of the timer 24 by a line 83. The other side of the timer 24 is connected to the neutral N by a line 84 so that 115 volts is supplied to the timer motor. The heater 41 is connected between the contact 33 and the line 66.

OPERATION

The circuit illustrated is capable of four separate modes of operation, namely a first mode of operation in the condition illustrated in FIG. 1 during which top heat is supplied by the broil heating element 12 along with the bottom heat from the bake heater element 11; a second bake mode of operation in which top heat is not supplied which is the mode represented by FIG. 2; and a keep-warm mode of operation which is the mode of operation illustrated by the condition illustrated in FIG. 3. A fourth mode of operation is provided in such system, namely, the broil mode of operation. However, the circuit condition for such mode of operation is not specifically illustrated.

BAKE WITH TOP HEAT

The mode operation in which baking occurs with top heat is illustrated in FIG. 1. This mode of operation is generally utilized for baking foods in which a top browning is desired such as bread, cookies, and most types of cakes. In this mode of operation, the oven thermostat 17 is set to the desired baking temperature. The selector switch 14 is rotated to a bake position in which the projection 30 engages the switch arm 26 and causes the contacts 27 and 28 to close. In such position, the contacts 32 and 33 of the selector switch are closed. When such contacts are closed, both the broil heating element and the heater 41 are energized. Consequently, the contacts 32 and 33 cycle open and closed on a time basis with about 8 percent of the cycle time closed. The keep-warm switch 16 is in the off position illustrated in FIG. 1 in which the switch arm 48 engages the contact 51.

The baking is commenced by setting the timer so that the switch arm 20 engages the contact 21 for timed baking or manually moving the switch arm 20 into engagement with the contact 21 for non-timed baking. When timed baking is utilized, the timer automatically functions to move the switch arm 20 away from the contact 21 at the end of the time set on the timer to a position against the contact 22. During the baking in this mode of operation, the bake heating element 11 is energized with 230 volts through the thermostat 17 whenever heat is required. Similarly, the broil heating element 12 is energized with 230 volts through the oven thermostat 17. However, the cyclic operation of the switch arm 31 causes the broil heating element to remain on only about 8 percent of the time that heat is demanded by the thermostat 17. When the desired temperature is reached in the oven, the thermostat 17 opens de-energizing both of the heaters 11 and 12. Consequently in this mode, both heaters are energized on demand by the thermostat 17 with the bake heater element on continuously whenever heat is demanded and the broil heating element 12 cycling on and off during the same period with a timed cycle of about 8 percent on. Since the oven signal light is connected across the line through the thermostat 17, it also turns on and off as the thermostat operates and is energized at the same time as the bake heating element 11.

The operation in this mode continues until the timer switch arm 20 is either automatically moved by the timer into engagement with the contact 22 or is opened manually to terminate baking. When the timer switch 20 moves into engagement with the contact 22, the circuit is broken and operation is terminated.

BAKING WITHOUT TOP HEAT

When baking without top heat is desired, a circuit condition as illustrated in FIG. 2 is utilized. This is a circuit condition existing prior to keep-warm operation and differs from the circuit condition of FIG. 1 only in that the keep-warm switch is operated to its on position in which the switch arm 48 engages the contact 53 and the switch arm 49 is closed with the contact 54. Here again, the selector switch is set in a bake position in which the switch arm 26 is closed with the contact 28 and the switch arm 31 is closed with the contact 33. Also, the oven thermostat is set at the desired temperature and the timer switch arm 20 is moved to the position in engagement with the contact 21. In this circuit condition, the bake heating element 11 is energized through the timer switch arm 20 and the thermostat switch arm 47 and cycles on and off on demand of the thermostat 17 to maintain the desired or set baking temperature. However, the broil heater element is not energized since the switch arm 48 of the keep-warm switch 16 is closed with the contact 53 and is, therefore, connected to the open contact 22 of the timer. Here again, the oven signal light 18 cycles on and off at the same time as the bake heating element 11.

At the completion of the timed baking cycle, the timer operates automatically to shift the switch arm 20 from the contact 21 to the contact 22. This terminates the baking operation by shuting off the bake heating element 11 and changes the mode of operation to the keep-warm mode of operation illustrated in FIG. 3.

KEEP-WARM OPERATION

After the bake without top heat is completed and the timer switch arm 20 moves to a closed position with the contact 22, the keep-warm mode of operation is automatically commenced. In this mode of operation, the bake heating element 11 is not energized. However, the broil heating element 12 is energized through the cycling switch arm 31 and the thermostat switch arm 27. Because the bake heating element is on only a small percentage of the time such as 8 percent of the time, the temperature in the oven drops causing the thermostat switch arm 47 to remain in the closed position. Consequently, a cyclic operation of the broil heating element continues. In the illustrated embodiment, the timed operation with an 8 percent on period of time causes heat to be supplied to the oven enclosure at a rate sufficient to achieve a balanced heat in-flow, heat out-flow condition in the oven when the oven temperature stabilizes at about 170°F. Of course, if the insulation of the oven is reduced, the on period for a given heater should be reduced to establish such a temperature balanced condition.

Preferably, the total cycle time of the broil heating element is arranged to be relatively short so that an even heat condition will be achieved. For example, the total cycle is preferably in the order of 1 to 1½ minutes with the on period on a 1 minute cycle of about 5 seconds followed by an off period of 54 seconds. On the 1½ minute cycle, the on time is in the order of 7 seconds followed by an off period of 1 minute, 23 seconds. With such a relatively short cycle period, overriding of any appreciable amount does not occur and the keep-warm temperature stabilizes and is maintained at a relatively constant temperature in the order of 170°–180°. During the keep-warm operation, the keep-warm signal light 19 is energized. When the keep-warm operation is to be terminated, the switch arm is manually moved to the off or center position.

BROIL OPERATION

The fourth mode of operation is the broil mode. Such circuit condition is not illustrated by separate figure. However, in normal broil, the oven selector switch is rotated in an anticlockwise direction from the position illustrated in FIG. 4 so that the cam ramp 42 moves into engagement with the leg 38 to increase the on percentage of time to the desired value above 8 percent. In such a condition, the projection 30 does not engage the switch arm 26 so the contacts 27 and 28 remain open preventing energy from being supplied to the bake heating element. The thermostat 17 is set to a broil position in which the switch arm 27 remains closed with the contact 61 unless excessive temperatures are encountered. When the timer switch arm 20 is in the position closed with the contact 21 and the keep-warm switch is open as illustrated in FIG. 1, the broil heating element is energized and cycled with a timed cycle determined by the position of the cam ramp 42 with respect to the leg 38.

The various elements are proportioned so that movement of the cam 29 to one extreme position causes the broil heating element to remain on constantly and in intermediate positions, the on-off operation of the broil heating element is achieved with the ratio of on to off time less than 100 percent and greater than 8 percent depending upon the position of the cam 29.

With an oven provided with a control circuit in accordance with this invention, four separate modes of operation are obtained in an economical and efficient manner. The cyclic operation of the broil heating element is provided for top heat baking when desired, and the same cyclic operation utilizing the same cycle producing switch mechanism is used for keep-warm operation. Consequently, it is not necessary to materially increase the complexity of the circuit to obtain the keep-warm mode of operation. Further, it is not necessary to reduce the voltage on either of the heating elements even for keep-warm operation. This is possible even though the broil heating element is a relatively high-powered unit in the order of 3,500 watts. Further, it is not necessary in the illustrated embodiment to utilize a separate low temperature thermostat or a compound thermostat to regulate the low or keep-warm temperature.

Although a preferred embodiment of this invention is illustrated, it is to be understood that various modifications and rearrangement of parts may be resorted to without departing from the scope of the invention disclosed and claimed herein.

What is claimed is:

1. A bake-broil oven comprising an oven enclosure, a bake heating element, a broil heating element, and a control circuit connected to control the operation of said heating elements, said control circuit including cycle means operable to cause cyclic operation of said broil heating element with an on-off timed cycle, said control circuit including a thermostat switch operable below predetermined selected temperatures to demand heat and a selector switch operable between two positions to provide two separate modes of operation, said control circuit when said selector switch is in a first position providing a first bake mode of operation causing said bake heating element to operate continuously on demand of said thermostat switch while said broil heating element operates on demand of said thermostat switch with said on-off timed cycle, said control circuit when said selector switch is in a second position operating to supply heat to said enclosure to maintain a low keep-warm temperature substantially below said predetermined selected temperature by operating said broil heating element with said on-off timed cycle.

2. A bake-broil oven as set forth in claim 1 wherein said control circuit in a second bake mode of operation operates said bake heating element continuously on demand without operating said broil heating element.

3. A bake-broil oven as set forth in claim 2 wherein said control circuit in a broil mode of operation operates said broil heating element without operating said bake heating element, and the same voltage is applied to said broil heating element in both said keep-warm mode of operation and said broil mode of operation.

4. A bake-broil oven as set forth in claim 3 wherein said control circuit includes a timer which functions to automatically shift from one of said bake modes of operation to said keep-warm mode of operation at the completion of a timed period.

5. A bake-broil oven as set forth in claim 4 wherein said one bake mode of operation is said second bake mode of operation.

6. A bake-broil oven as set forth in claim 5 wherein a single switch is operable to change said control circuit from said first bake mode of operation to said second bake mode of operation.

7. A bake-broil oven as set forth in claim 1 wherein said control circuit in said keep-warm mode of operation operates said broil heating unit continuously with said timed on-off cycle, and the keep-warm temperature of said enclosure is determined without thermostat means solely by a balance of the rate of heat supplied thereto and heat dissipated therefrom.

8. A bake-broil oven comprising an oven enclosure, a bake heating element, a broil heating element, and a control circuit connected to control the operation of said heating elements, said control circuit including cycle means providing a first switch adjustable between a continually closed condition and an on-off condition with a minimum on period, said cycle means also including a second switch which is closed when said first switch is in the condition of said minimum on period, said cycle means being manually adjustable when said control circuit is in a broil mode of operation operating said broil heating element from a condition in which said broil heating element operates continuously to a condition in which said broil heating element operates with a timed on-off cycle with said minimum on period, said control circuit supplying heat to said enclosure for a keep-warm mode of operation by cyclic operation of said broil heating element with said minimum on period, said control circuit supplying the same voltage to said broil heating element in both said broil mode of operation and said keep-warm mode of operation.

9. A bake-broil oven as set forth in claim 8 wherein said control circuit in said keep-warm mode of operation operates without thermostatic control and the keep-warm temperature is determined solely by the balance of the rate of heat supplied to said enclosure and the rate of heat dissipated therefrom.

10. A bake-broil oven as set forth in claim 8 wherein said control circuit in a bake mode of operation operates said bake heating element continuously on demand without operating said broil heating element, and said control circuit includes timing means for automatically shifting the mode of operation from said bake mode of operation to said keep-warm mode of operation.

11. A bake-broil oven as set forth in claim 8 wherein said predetermined on-off timed cycle has a duration sufficiently short to maintain a substantially constant keep-warm temperature in said enclosure.

12. A bake-broil oven as set forth in claim 11 wherein said predetermined on-off timed cycle has a duration no longer than about one and one-half minutes and the on period of said on-off cycle is no greater than about 8 percent of the cycle.

13. A bake-broil oven comprising an oven enclosure, a bake heating element, a broil heating element, and a control circuit connected to control the operation of said heating elements, said control circuit including a thermostatic switch operable below predetermined selected temperatures to demand heat, a selector switch operable between first and second positions, and cycle means providing a cyclically operated switch which is adjustable between a position in which said cyclically operated switch is closed continuously and a position in which said cyclically operated switch operates with an on-off cycle having a minimum on period, said cycle means also including a second switch in series with said bake heating element which is closed only when said cycle means is adjusted to said position with a minimum on period, said control circuit providing a first bake mode of operation in which said selector switch is in said first position and said cycle means is in said minimum on period position in which said bake heating element operates continuously on demand of said thermostat switch while said broil heating element operates on demand of said thermostatic switch with said minimum on period, said control circuit when said selector switch is in a second position while said cycle means are in said position of minimum on period providing a bake mode of operation in which said bake heating element is controlled by said thermostatic switch and is on continuously when said thermostatic switch is closed and a keep-warm mode in which said bake heating element is off and said broil heating element operates on and off with said minimum on period, said oven being provided with a keep-warm temperature determined solely by the on-off period of said broil heating element.

* * * * *